United States Patent [19]

Boyles

[11] Patent Number: 4,460,069
[45] Date of Patent: Jul. 17, 1984

[54] CAM-ACTUATED DISC BRAKE

[76] Inventor: Elmo N. Boyles, 5453 Old Shell Rd., Apt. 154, Mobile, Ala. 36608

[21] Appl. No.: 370,985

[22] Filed: Apr. 22, 1982

[51] Int. Cl.³ .............................................. F16D 55/02
[52] U.S. Cl. ................................. 188/72.7; 192/93 R
[58] Field of Search ................. 188/18 A, 24.15, 72.3, 188/72.7, 72.8, 73.46, 72.6; 74/107, 110; 192/70.23, 70.24, 93 R, 93 B

[56] References Cited

U.S. PATENT DOCUMENTS

| 2,234,310 | 3/1941 | Maybach | 188/72.7 |
| 2,245,988 | 6/1941 | Lambert | 188/72.8 |
| 3,743,060 | 7/1973 | Hendrickson | 188/72.6 |
| 4,102,440 | 7/1978 | Wood | 188/72.7 |

FOREIGN PATENT DOCUMENTS 1373940  6/1966  France ........................ 188/72.8

Primary Examiner—Douglas C. Butler
Assistant Examiner—R. R. Diefendorf

[57] ABSTRACT

In a disc brake, two cams on a single shaft simultaneously urge brake shoes into frictional contact with both sides of the disc.

2 Claims, 3 Drawing Figures

CAM-ACTUATED DISC BRAKE

The invention relates to the art of disc brakes, and more particularly to the art of mechanically actuating such brakes.

As is known, disc brakes have a number of advantages over drum brakes. Disc brakes accordingly have become increasingly more widely used in a variety of applications. In order to maximize the braking power available for a given disc diameter, it is known to provide a brake shoe for frictionally engaging each side of the disc. These shoes are typically operated by separate hydraulic or pneumatic actuators. Providing two actuators for each disc, while normally effective, is expensive. In addition there are applications wherein two actuators per disc is impractical because of space or other limitations.

These and other disadvantages of prior art disc braking mechanisms are avoided by the present invention.

According to a major aspect of the invention, there is provided a cam-actuated disc brake, comprising a brake disc mountable on an axle for rotation with and about the axis of the axle; first and second brake shoes mounted adjacent opposite faces of the disc; means for supporting the shoes for motion parallel to the axis; means for preventing the shoes from rotating with the disc; first camming means actuable to cam the first shoe into contact with the disc; second camming means actuable to cam the second shoe into contact with the disc; and means for simultaneously actuating the first and the second camming means.

According to another aspect of the invention, the first and second camming means comprise respective first and second cams rigidly mounted on a common camshaft adjacent the first brake shoe.

According to another aspect of the invention, the second camming means comprises link means connecting the second cam with the second shoe, the link means freely spanning the first shoe and the disc.

According to another aspect of the invention, at least one of the first and second cams has a circular cross-section outer periphery eccentric with respect to the axis of the camshaft, and wherein a cam follower cooperating with at least one of the first and second cams has a circular aperture receiving the circular outer periphery.

According to another aspect of the invention, the brake further comprises mechanically actuated parking brake means for camming of the shoes into contact with the disc.

According to another aspect of the invention, the parking brake means comprises a shaft substantially parallel to the axis and a cam mounted on the shaft, the cam having a camming surface bearing on and urging the shoe into frictional contact with the disc when the shaft is rotated.

According to a second major aspect of the invention, there is provided a cam-actuated disc parking brake assembly, comprising a brake disc mountable on an axle for rotation with and about the axis of the disc; a brake shoe mounted adjacent one face of the disc; means for supporting the shoe for motion parallel to the axis; means for preventing the shoe from rotating with the disc; and mechanically actuated parking brake means for camming the shoe into frictional contact with the disc.

According to another aspect of the invention, the parking brake means comprises a shaft substantially parallel to the axis and a cam mounted on the shaft, the cam having a camming surface bearing on and urging the shoe into frictional contact with the disc when the shaft is rotated.

Other aspects will in part appear hereinafter and will in part be apparent from the following detailed description taken together with the accompanying drawing, wherein.

Figure 1:
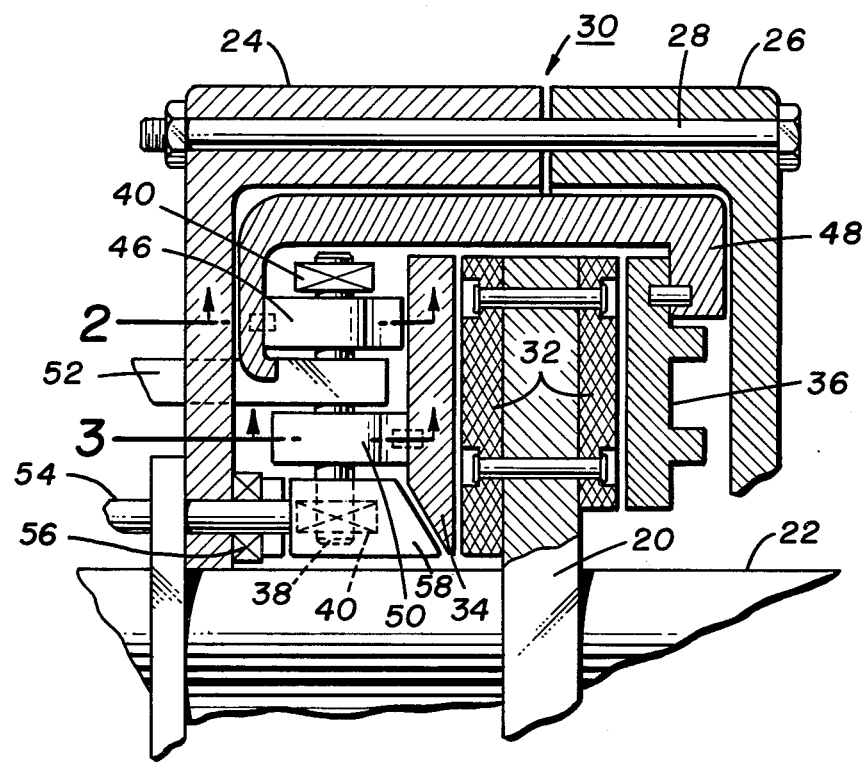
FIG. 1 is a front elevation view of the upper half of a brake assembly, partly broken away, of the preferred embodiment of the invention as applied to the axle of a vehicle.

As shown in FIG. 1, brake disc 20 is rigidly mounted on rotatable axle 22 for rotation with and about the axis of axle 22. Annular frame members 24 and 26 are held together by bolt 28, forming a frame 30 enclosing disc 20 and the remainder of the brake assembly as will be described below. Frame 30 is rigidly mounted on the non-rotating axle housing (not illustrated) surrounding axle 22. In the preferred embodiment illustrated, brake linings 32 of suitable materials are rigidly mounted on disc 20.

First annular brake shoe 34 is mounted within frame 30 adjacent the inboard or proximal face of disc 20, while second annular brake shoe 36 is mounted within frame 30 adjacent the outboard or distal face of disc 20.

Figure 2:
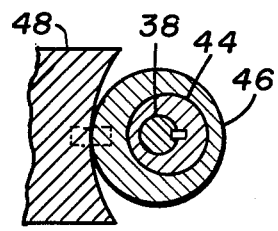
FIG. 2 is a sectional view taken along line 2 in FIG. 1.
Figure 3:
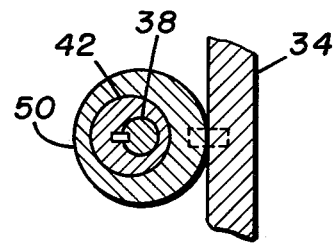
FIG. 3 is a sectional view taken along line 3 in FIG. 1.

Camshaft 38 is supported at the proximal side of shoe 34 in suitable bearings 40 supported by frame 30, and has rigidly mounted thereon first and second circular cams 42 and 44 eccentrically mounted on shaft 38, as shown in FIGS. 2 and 3, respectively. While cams 42 and 44 are for purposes of illustration shown as separate elements keyed to shaft 38, they may be formed integrally with shaft 38. Cams 42 and 44 are preferably dimensioned to provide a mechanical advantage, for example, two to one.

Cam follower 46 is mounted on cam 44, and has a circular aperture therethrough for receiving the circular outer periphery of cam 44. The proximal or inboard surface of cam follower 46 is keyed or otherwise rigidly attached to the proximal end of link 48, the surface of which in the region of contact with follower 46 is preferably concave, as shown in FIG. 2. Link 48 freely spans without touching inboard shoe 34 and disc 20, and has its distal end rigidly attached to outboard shoe 36. Auxiliary or alternative means (not shown) may be provided for further supporting and preventing rotation of shoe 36 with disc 20 about the axis of axle 22.

Cam follower 50 is mounted on cam 42, and has a circular aperture therethrough for receiving the circular outer periphery of cam 42. The outboard surface of cam follower 50 is keyed or otherwise rigidly attached to the inboard surface of inboard shoe 34. As with shoe 36, auxiliary or alternative means may be provided for supporting and preventing rotation of shoe 34 with disc 20.

Lever 52 has its outboard or distal end rigidly attached to camshaft 38 and its inboard or proximal end attached to motive means for rotating camshaft 38 about the axis of camshaft 38. A conventional pneumatic or hydraulic cylinder, or other equivalent means (not illustrated), may constitute the motive means.

In operation of the brake assembly as thus described, lever 52 is actuated, rotating camshaft 38 about its axis.

As camshaft 38 rotates, cam 42 by means of cam follower 50 urges shoe 34 into frictional contact with the proximal side of disc 20. Simultaneously, cam 44 by means of cam follower 46 and link 48 urges shoe 36 into frictional contact with the distal side of disc 20. The provision of both cams 42 and 44 on the single camshaft 38 provides for a particularly compact and inexpensive mechanism, and avoids the previous necessity for provision of a hydraulic or pneumatic cylinder on each side of disc 20.

A mechanical parking brake assembly is also provided, as shown in FIG. 1. Parking brake camshaft 54 extends substantially parallel to the axis of axle 22, and is journalled in bearing 56 mounted on frame member 24. Parking cam 58 is mounted coaxially with and on the distal end of shaft 54, and has its distal end bevelled to provide a camming surface. The inner proxmal edge of shoe 34 is correspondingly bevelled in the region adjacent the bevelled camming surface of cam 58.

In the parking brake assembly as thus described in the previous paragraph, when camshaft 54 is rotated about its axis, the extreme distal end of cam 58 engages the adjacent bevelled inner proximal surface of shoe 34, camming shoe 34 into frictional engagement with disc 20. Any suitable parking actuating means, such as a cable-actuated lever attached to shaft 54, is provided for mechanically rotating shaft 54 about its axis, and for maintaining the parking camshaft 54 thus actuated until it is deliberately released. Provision of such parking actuating means is well within the scope of one skilled in the art.

While for the sake of simplicity, the drawings and description above have referred only to the upper half of the brake assembly, in practice it would be preferable to provide a duplicate set of braking elements on the opposite or lower side of axle 22, to avoid distortion of disc 20 and shoes 34 and 36.

What is claimed is:
1. A cam-actuated disc brake, comprising:
   (a) a brake disc mountable on an axle for rotation with and about the axis of said axle;
   (b) first and second brake shoes mounted adjacent opposite faces of said disc;
   (c) means for supporting said shoes for motion parallel to said axis;
   (d) means for preventing said shoes from rotating with said disc;
   (e) first camming means actuable to cam said first shoe into contact with said disc;
   (f) second camming means actuable to cam said second shoe into contact with said disc;
   (g) means for simultaneously actuating said first and said second camming means; and
   (h) said first and second camming means comprising respective first and second cams rigidly mounted on a common camshaft adjacent said first brake shoe, at least one of said first and second cams having a circular cross-section outer periphery eccentric with respect to the axis of said camshaft, and wherein a cam follower cooperating with said at least one of said first and second cams has a circular aperture receiving said circular outer periphery.
2. A cam-actuated disc brake, comprising:
   (a) a brake disc mountable on an axle for rotation with and about the axis of said axle;
   (b) first and second brake shoes mounted adjacent opposite faces of said disc;
   (c) means for supporting said shoes for motion parallel to said axis;
   (d) means for preventing said shoes from rotating with said disc;
   (e) first camming means actuable to cam said first shoe into contact with said disc;
   (f) second camming means actuable to cam said second shoe into contact with said disc;
   (g) means for simultaneously actuating said first and said second camming means; and
   (h) mechanically actuated parking brake means for camming one of said shoes into contact with said disc, said parking brake means comprising:
      (1) a shaft substantially parallel to said axis; and
      (2) a cam mounted on said shaft, said cam having a camming surface bearing on and urging said shoe into frictional contact with said disc when said shaft is rotated.

* * * * *